United States Patent
Kelsey

(10) Patent No.: US 9,077,652 B2
(45) Date of Patent: Jul. 7, 2015

(54) METHODS FOR LIMITING NUMBER OF ROUTERS IN A MESH NETWORK

(71) Applicant: Silicon Laboratories, Inc., Austin, TX (US)

(72) Inventor: Richard Kelsey, Belmont, MA (US)

(73) Assignee: Silicon Laboratories Inc., Austin, TX (US)

(*) Notice: Subject to any disclaimer, the term of this patent is extended or adjusted under 35 U.S.C. 154(b) by 0 days.

(21) Appl. No.: 14/041,056

(22) Filed: Sep. 30, 2013

(65) Prior Publication Data

US 2015/0092535 A1    Apr. 2, 2015

(51) Int. Cl.
*H04L 12/26* (2006.01)
*H04L 12/703* (2013.01)

(52) U.S. Cl.
CPC ...................................... *H04L 45/28* (2013.01)

(58) Field of Classification Search
CPC ......... H04L 47/10; H04L 47/30; H04L 47/11; H04L 47/12; H04L 12/5602; H04L 47/27; H04L 2012/5635; H04L 47/35; H04L 47/32; H04L 45/28; H04L 2012/5627; H04L 41/0668; H04L 41/0654
USPC .......... 370/400, 229, 231, 235, 219, 220, 389
See application file for complete search history.

(56) References Cited

U.S. PATENT DOCUMENTS

| | | | | |
|---|---|---|---|---|
| 2003/0187972 A1* | 10/2003 | Bauchot | ......................... | 709/223 |
| 2007/0030847 A1* | 2/2007 | Frei et al. | ...................... | 370/389 |
| 2008/0279100 A1* | 11/2008 | Yuan et al. | ..................... | 370/231 |
| 2013/0263197 A1* | 10/2013 | Yuan et al. | ..................... | 725/109 |

* cited by examiner

*Primary Examiner* — Brenda H Pham
(74) *Attorney, Agent, or Firm* — Nields, Lemack & Frame, LLC

(57) ABSTRACT

In some cases, it may be desirable to limit the number of routers in a mesh network. Various techniques to limit the number of routers, without affecting connectivity, are disclosed. In some embodiments, a node enables its router capability if there are less than a predetermined number of routers already in the network. In other embodiments, a node enables its routing capability only is it is necessary to resolve a connectivity issue or a biconnectivity issue. In some cases, a node, which previously enabled its router capability, may no longer be required to be a router. In some embodiments, this node, upon making this determination, disables its routing capability.

14 Claims, 5 Drawing Sheets

METHODS FOR LIMITING NUMBER OF ROUTERS IN A MESH NETWORK

This disclosure describes methods of limiting the number of routers in a mesh network.

BACKGROUND

Mesh networks are a type of network in which nodes often have several functions. In addition to their primary function as a sensor, actuator, or other device, these nodes also serve as routers, helping move traffic between two other nodes in the network. Mesh networks can grow quite large, often having over 100, or in some case over 1000, nodes, many or most of which are also routers.

While mesh networks tend to be robust, since there are often multiple paths between any two nodes, there are drawbacks as well. For example, with such a large number of nodes, it becomes impractical for each node to know the most efficient path to every other node in the network. Mesh networks typically utilize one or more route discovery protocols. Regardless of the protocol used, as the number of routers in the mesh network increases, the amount of routing data that must be retained and communicated throughout the network, likewise increases.

This increased amount of router data may require the individual nodes to become more expensive, as the amount of storage required to store this information grows. This forces a design tradeoff. Either the amount of memory in each router must be increased, which increases cost, or the routers are forced to each only hold a subset of all routing information. In other words, rather than saving the next hop to every other node, an intermediate router may only save the next hop to a predetermined number of other routers. This option conserves memory space, but also serves to increase the number of route discovery messages, since some previously acquired network topology information must necessarily be purged. In other embodiments, this increased amount of router data may create more overhead messages in the network, effectively reducing the bandwidth available for useful traffic. One common method to reduce the routing information is to use source routing, where a central device maintains routing information and this information is used in the packet header. This method reduces memory requirements on the nodes in the network but increases the memory requirements on the central device, requires all messages to travel through the central device, and increases over the air message size (and therefore power consumption of the device) to include the routing information.

Therefore, it would be beneficial if there were a method to limit the number of routers in a mesh network, as this would reduce the number of route discovery messages and other overhead traffic that travels on the mesh network. It would also reduce the amount of memory needed in each node to store the routing information.

SUMMARY

In some cases, it may be desirable to limit the number of routers in a mesh network. Various techniques to limit the number of routers, without affecting connectivity, are disclosed. In some embodiments, a node enables its router capability if there are less than a predetermined number of routers already in the network. In other embodiments, a node enables its routing capability only is it is necessary to resolve a connectivity issue or a biconnectivity issue. In some cases, a node, which previously enabled its router capability, may no longer be required to be a router. In some embodiments, this node, upon making this determination, disables its routing capability.

According to one embodiment, a method of limiting the number of routers in a mesh network, the mesh network comprising a plurality of nodes, is disclosed. The method, which is executed by each of the plurality of nodes, comprises determining a number of routers currently in the mesh network; enabling routing capability of a node if a number of routers currently in the mesh network is less than a predetermined threshold; monitoring network traffic to identify a connectivity issue; and enabling routing capability of the node if the connectivity issue is detected and the node can resolve the connectivity issue.

According to another embodiment, a method of creating a mesh network having biconnectivity, the mesh network comprising a plurality of nodes, is disclosed. The method, which is executed by each node, comprises monitoring network traffic to determine neighbors of a node; querying each of the neighbors to determine neighbors of the neighbors; determining that at least one of the neighbors is part of a first group and at least a second of the neighbors is part of a second group, where there are no nodes common to the first group and the second group; and sending a request from the node to find another node which is in communication with the first group and the second group.

According to a third embodiment, a method of limiting the number of routers in a mesh network, the mesh network comprising a plurality of nodes, is disclosed. The method, which is executed by each of the plurality of nodes, comprises monitoring, at a node, network traffic; identifying a connectivity issue; and enabling routing capability of the node if the node can resolve the connectivity issue.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
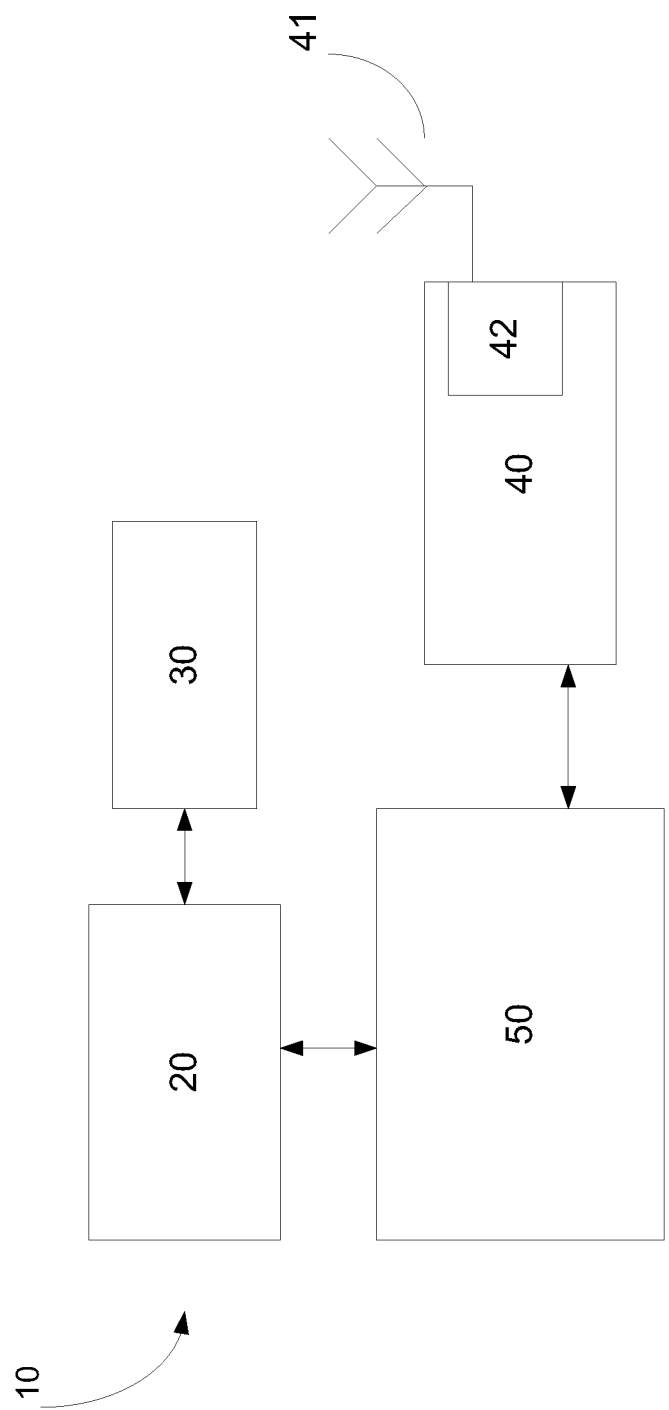
FIG. 1 is a block diagram of a node in a mesh network.

Devices that are used in mesh networks are typically small, often battery powered. FIG. 1 shows a block diagram of a representative device 10. The device 10 has a processing unit 20 and an associated memory device 30. This memory device 30 contains the instruction, which, when executed by the processing unit, enable the device 10 to perform the functions described herein. This memory device 30 may be a non-volatile memory, such as a FLASH ROM, an electrically erasable ROM or other suitable devices. In other embodiments, the memory device 30 may be a volatile memory, such as a RAM or DRAM. The device also includes a network interface 40, which is typically a wireless interface including an antenna 41. Additionally, the network interface may comprise a radio 42, which includes the baseband processing and MAC level processing. The device 10 may include a second memory device 50 in which data that is received by the network interface 40, and data that is to be transmitted by the network interface 40, is stored. This second memory device 50 is traditionally a volatile memory. The processing unit 20 has the ability to read and write the second memory device 50 so as to communicate with the other nodes in the network. Although not shown, each device 10 also has a power supply, which may be a battery or a connection to a permanent power source, such as a wall outlet.

As described above, one of the issues associated with mesh networks is the amount of overhead traffic generated by, in particular, route discovery messages. As the number of routers increases, the number of these route discovery messages increases as well. In fact, the increase in overhead traffic grows faster than the number of routers, for several reasons. First, more routers necessarily means that there are more routes in the mesh network in general. Second, as described above, each node typically only saves a portion of the routing information, where this portion is determined based on memory size. Thus, as the number of routers increases, the number of known and saved routes, as a percentage of the total number of possible routes, necessarily decreases.

One way to address this issue is to limit the number of routers in the mesh network. It would be more advantageous if this number were limited by the nodes themselves, rather than using manual intervention. In other words, most devices in a mesh network have the capability to become routers. Currently, in most mesh networks, devices which have the capability to become routers enable this functionality by default. Thus, often if there are N devices in a mesh network which are capable of being routers, all or nearly all of the N devices will be routers. In small networks, this operation is not detrimental, as the other nodes can easily communicate and retain information about all N routers. However, as the value of N grows the cost of communicating and retaining the routing information increases. Larger networks require more memory and more capable communication links or limit routing information to a small subset of nodes, typically one or at most a few.

The practice of enabling router functionality by default leads to a robust network, in that there are a maximum of different paths between any two nodes in the mesh network. However, some of this robustness may be unnecessary. For example, a conference room, which may be 15 feet wide and 20 feet long, may have a lighting system that is controlled by a mesh network. A node may be associated with each light, such that there are tens of nodes in the conference room. As explained above, by default, most of these nodes will be routers, thereby creating a large number of possible routes between any two nodes. However, in a room of this size, the transmission range of each node is such that it can be received by every other node in the room. Therefore, it is unnecessary for each node to be a router. It may be sufficient for only one router to exist. Traffic between any two nodes can happen directly, without any need to use intermediate hops. If necessary, a router is available to facilitate communications and provide a redundant path between any two nodes.

Furthermore, consider the example where there are tens of routers included in a single conference room. While this may be acceptable in this limited environment, network growth may be problematic. Assume, for example, that the user wishes to expand this lighting system to cover an entire building with many conference rooms and office spaces. If each node becomes a router, there may be hundreds of routers in the building. However, as described above, based on the transmission range of each node and the size of the building, perhaps only a handful of routers are truly required.

The following describes a set of algorithms that may be used to allow a node in a mesh network to determine whether it should enable its router capability. A second set of algorithms is also defined which allow a node to determine whether it should disable its currently enabled router functionality. This combination of algorithms can be used to generate a mesh network which is robust and contains an appropriate number of routers.

Throughout this disclosure, reference is made to a leader node. In some embodiments, a leader node is responsible for maintaining a list of all routers in a network. In these embodiments, the leader node may also be responsible for assigning router numbers.

However, in other embodiments, there may not be a leader node. For example, in some embodiments, each router is responsible for maintaining its own list of routers, which may be determined using available routing algorithms. In this embodiment, each router may select a router identification number based on its MAC address to insure that all routers numbers are unique. However, other naming conventions may also be used.

It is important to note that a node typically makes the determination to enable its router capability when it first joins a network. In one embodiment, it sends a request to a leader node requesting permission to enable its routing functionality. In this embodiment, the leader node is a node that is responsible for accepting or denying router requests. If the leader node accepts the request, it assigns a router ID to the newest router. In another embodiment, the node enables its routing capability autonomously. In this embodiment, as described above, the node may select a router ID based on its MAC address. Thus, in both embodiments, the node makes a determination as to whether to enable its router capability. In the first embodiment, the node must submit this request to a leader node, while in the second embodiment, it simply enables this capability.

According to a first algorithm, a new Node A that joins a mesh network waits before determining whether to become a router. The first criteria used to determine whether Node A should become a router is the number of routers that are presently in the network. If this number is less than a predetermined number, then the newly joined Node A may choose to enable its router functionality. As described above, in some embodiments, this may be done by sending a router request to the leader node. If the number of routers in the mesh network exceeds this predetermined limit, the newly joined Node A will not automatically determine that it should become a router. However, as explained in more detail below, other criteria may be used to later determine that it is advantageous for this node A to become a router. This newly joined Node A may determine the number of existing routers in the network in a number of ways.

In one embodiment, it may send a request for this information to the leader node, which responds with the desired number. In another embodiment, the newly joined Node A may listen to all of the network traffic and determine, based on the traffic that it can hear, the number of active routers in the network. In yet another embodiment, this information may be maintained by other nodes in the mesh network, such that the newly joined Node A simply queries another node in the network to gain this information. This node may be any node in the network, or may be a router. Of course, other methods of determining the number of routers in a mesh network are also possible and within the skilled in the art.

If the newly joined Node A has determined that it will not become a router, other factors may change that determination. For example, assume that after this Node A joined the mesh network, another Node B attempts to join. Node B is in the listening range of Node A, so Node A is able to hear its request to join the network. If this request from Node B is not responded to, Node A may determine that it may be the only node in the mesh network which is within the listening range of Node B. Thus, if Node B is going to be able to join this mesh network, it must do so by communicating through Node A. This scenario typically occurs as the network is being created. Thus, in this instance, Node A may make a determination that, based on Node B's inability to join the network, it should become a router. In some embodiments, it then sends this request to the leader node. Once this request is granted, it is now able to forward Node B's request to join the network to other nodes in the mesh network, thereby allowing Node B to join. In other embodiments, Node A simply enables its router capability and communicates this to its neighbors. In yet other embodiments, Node A makes no determination on its own, but instead informs Node B that it (Node A) is provisionally available as a router. If Node B does not receive a reply from any routers but does receive one or more provisional replies, it can choose one of them and send a request back to the sender to become a router.

As described above, lack of connectivity for a new node wishing to join the mesh network may be one factor that leads Node A to request to become a router. However, connectivity issues may arise in other scenarios as well.

Figure 2:
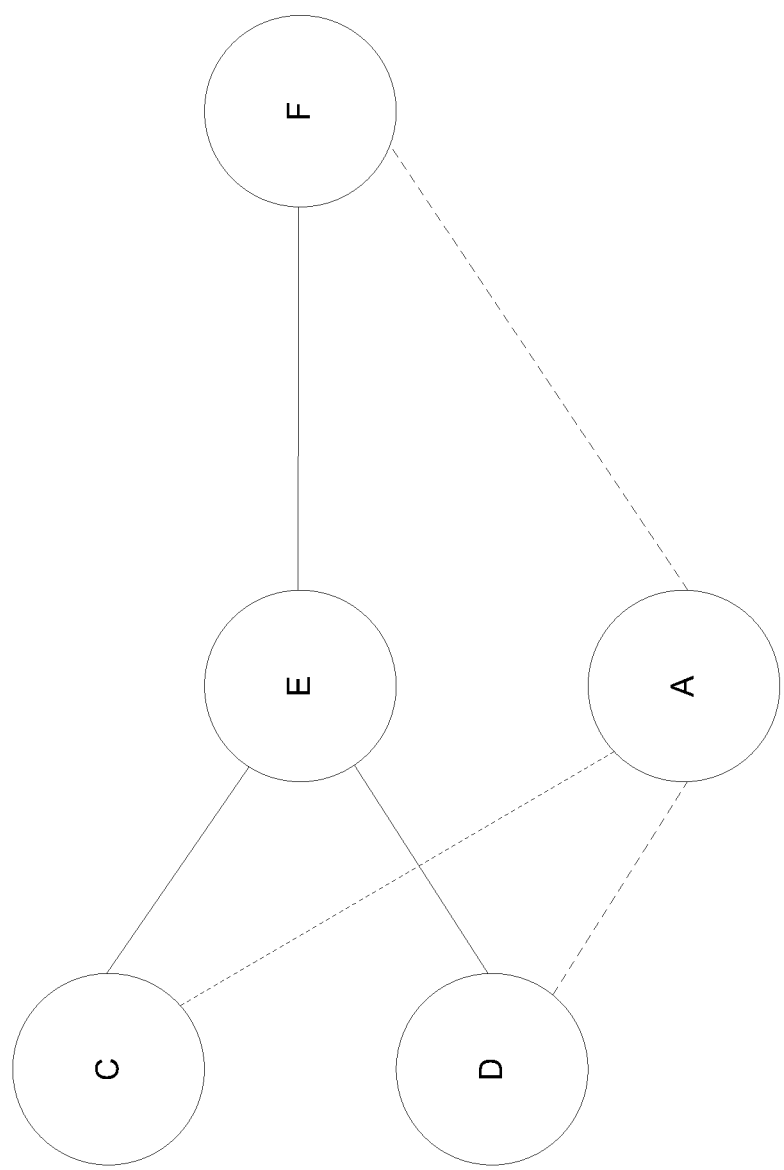
FIG. 2 is a network topology showing a connectivity issue.

Assume a network topology shown in FIG. 2. In this topology, Node A is not a router, since Nodes C and D are connected to the rest of the network, including Node F, via Node E. In other words, Node A did not need to become a router in order for Node C and Node D to join the network. However, assume that, at a later time, Node E becomes unavailable. Since Node E was the conduit by with Node C and Node D communicated in the network, they are now unable to communicate with any other nodes. Thus, a transmission sent by Node C or Node D to Node F will not be forwarded. Similarly, a transmission to Node C or Node D from Node F in the mesh network cannot be delivered. Thus, Node A, which is within the listening range of Node C, Node D and Node F, may determine that these nodes cannot access one another. Since Node A is able to serve as a bridge between these nodes, it seeks to become a router. Once Node A becomes a router, Node C and Node D are able to communicate with Node F again, using Node A as a router.

Thus, a first criteria by which a node, which previously was not a router, can determine that it should enable its router capability is connectivity. Node A may determine that two other nodes, both of which are within the listening range of Node A, cannot communicate with each other. This may occur during network build out (i.e. at initial enumeration of the network) or due to a topology change. In either scenario, the Node A will seek to enable its router capability, either automatically or by sending a router request to the leader node.

The previous algorithm is useful in guaranteeing that a mesh network maintains connectivity between all its member nodes. However, in the event that a node becomes suddenly unavailable, such as in the scenario shown in FIG. 2, there is a measurable delay until a new router is enabled and the new routes are created.

A second algorithm may used to insure that there is biconnectivity throughout the network. Biconnectivity is defined as the ability to communicate between any two nodes via two different paths. Nodes in the network may act proactively to insure that biconnectivity exists. For example, assume a network topology shown in FIG. 3. In this topology, Node A is a router, which is able to communicate with Nodes B, C, D and E directly. Node F can communicate with Node C, but cannot reach to Node A. Similarly, Node G can communicate with Node E, but cannot reach Node A. Node X is able to communicate with at least Node C and Node E. Node F may be able to communicate with Node G.

Each router in the network can communicate certain status to others in the network. For example, each router may communicate the routers that it can reach and its direct neighboring routers. When Node A receives this information for its direct neighbors (i.e. Node B, C, D, and E), it finds that on one side there is a grouping of BCF, since Node B reports its neighbors are A and C and Node C reports its neighbors are B and F. Similarly, it learns that there is a second group of DEG on its other side. Note that there are no nodes in common between these two groupings. Since Node A cannot see Nodes F and G, it cannot determine whether these nodes are in communication.

Based on the collected information, Node A believes that is a single point of failure between the grouping BCF and the grouping DEG. As such, it may send a request out asking if there is a node that is able to connect these two groups. This request may be sent only to its neighbors, or may be disseminated throughout the network.

Node X, which is currently not a router, receives this request from Node A. As Node C and Node E are both within its listening range, it determines that it is able to connect these two groupings together. Therefore, in one embodiment, it responds to Node A that it is able to connect these groupings. In one further embodiment, it also reports its cost associated with each node in these groupings. In this way, Node A may determine the best node to serve as a redundant path between these groupings. Node A then notifies Node X that it has been selected to serve as the redundant link. Upon receipt of this message, Node X enables its router capability, or, in other embodiments, sends a router request to the leader node. According to a second embodiment, Node X does not respond to Node A. rather, it immediately enables its router capability or, in another embodiment, sends the router request to the leader node upon determination that it can serve as a redundant link between groupings BCF and DEG.

Figure 3:
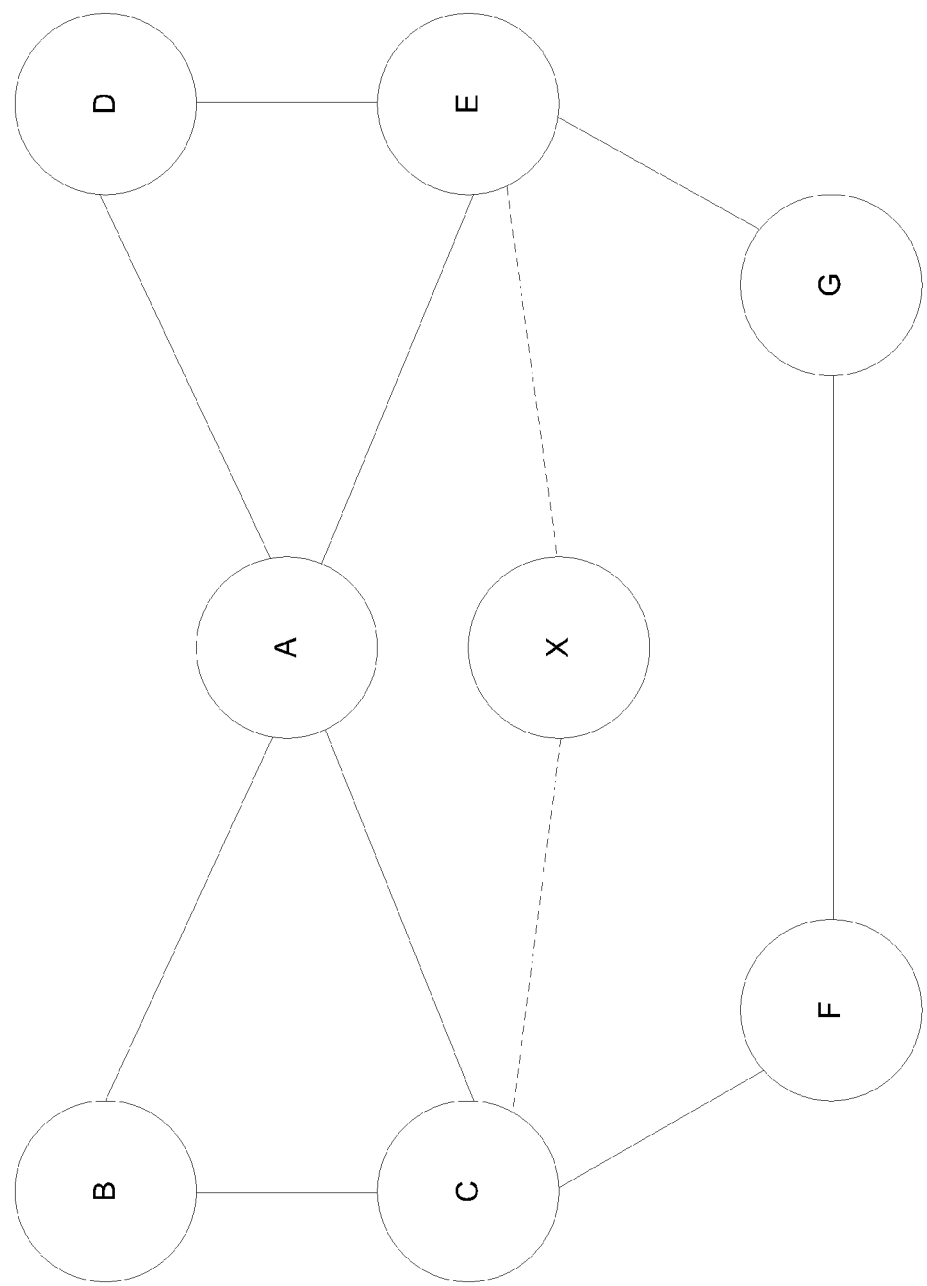
FIG. 3 is a network topology showing a biconnectivity issue.

Note that Node A may not have been the single point of failure in FIG. 3, as a path may exist between Node F and Node G. However, the use of this connection as the redundant link would creates a path between Node B and Node D that is 5 hops long. In some embodiments, this may be unacceptable. Therefore, the choice of Node X as the redundant link may reduce the distance between Node B and Node D.

Thus, the desire to insure that the entire network has biconnectivity may be a second criteria used to determine that a node requests permission to become a router.

The previous set of algorithms may be used to determine how a node determines that it should become a router. For example, as described above, upon initialization, a node may decide to become a router simply because there are few other routers currently in the network. However, as the network grows, this decision may, in hindsight, have been suboptimal.

Consider the earlier example of the lighting system for the conference room. As the network in the conference room is enumerated, each node may determine that it can be a router, based solely on the limited number of routers in the network. However, as the network continues to grow, such as by the inclusion of other conference rooms or office space, these nodes are now unnecessary. Furthermore, if it is desirous to have a maximum number of routers in a network, these nodes are consuming valuable resources in the network.

Thus, in one embodiment, a system having multiple thresholds may be used. For example, if the desired maximum number of routers is 25, a first predetermined limit may be set at a smaller number, such as 10. If there are fewer than this predetermined number of routers, then the node will seek to become a router. If the number of existing router exceeds this threshold, the node can only become a router if one of the other criteria is satisfied. This allows the network to be enumerated quickly, while also lowering the possibility that the maximum number of routers is exceeded.

Therefore, in one embodiment, there are at least two limits. First, there is the maximum number of routers ($N_{max}$) allowed in the network. There may be another predetermined threshold, $N_{init}$, less than $N_{max}$. If the number of existing routers is less than $N_{init}$, then a newly joined node automatically enables its router capability, or in another embodiment, immediately sends a router request to the leader node. If the number of existing routers is greater than $N_{init}$, then the newly joined node can only become a router is required to do so as a result of the connectivity or biconnectivity algorithms. The relationship between $N_{max}$ and $N_{init}$ is a design parameter and no fixed relationship is mandated. For example, in some embodiments, $N_{init}$ may be 50% of $N_{max}$. In other embodiments, $N_{init}$ may be a fixed amount less than $N_{max}$, such as 10 less than $N_{max}$.

Figure 4:
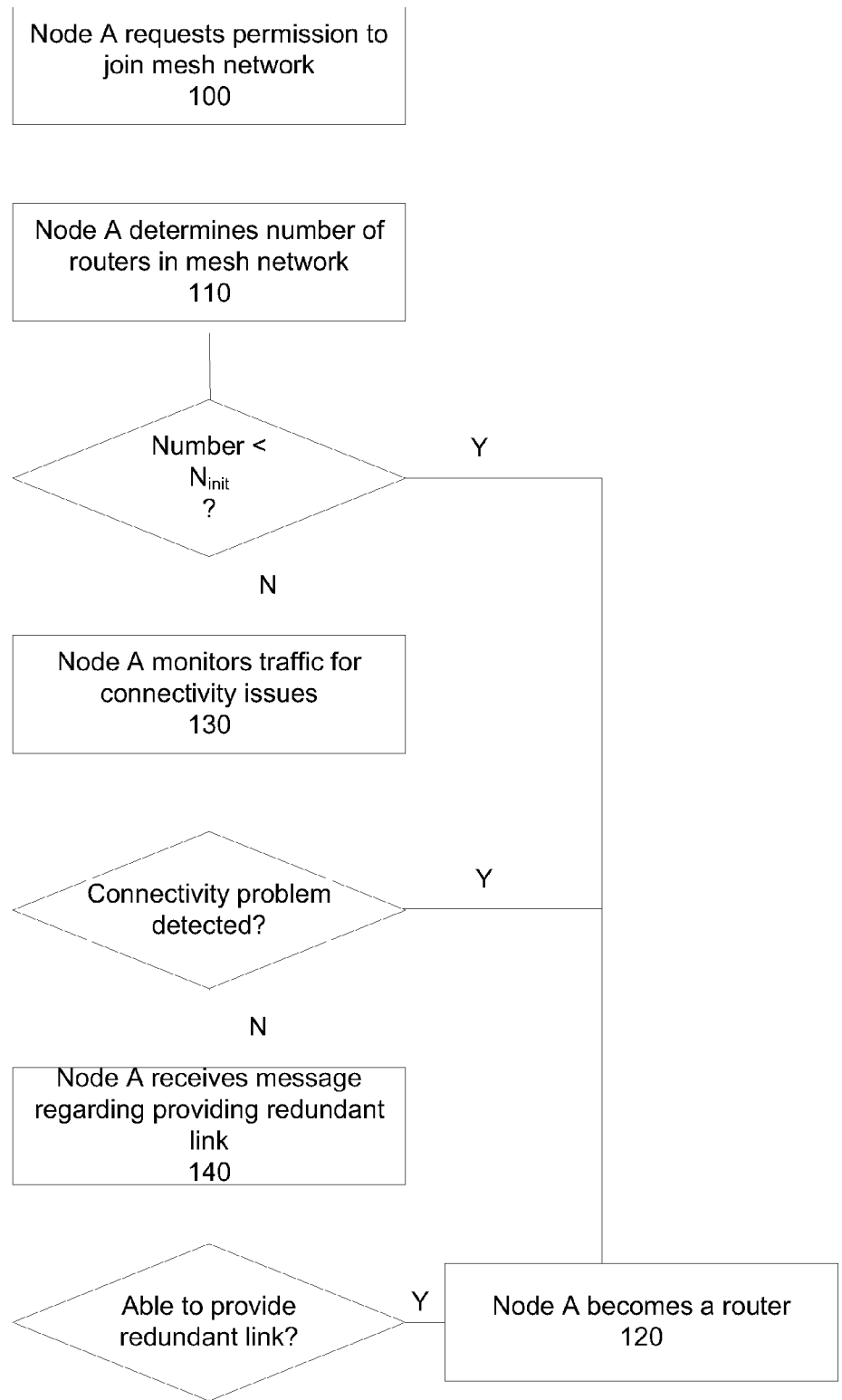
FIG. 4 is a flowchart showing decisions made before sending router request.

FIG. 4 shows a flowchart illustrating the various decisions which may be made by a node in the mesh network. First, as shown in step 100, upon power initialization, Node A requests to join a mesh node. This request may be sent to the leader node, which typically will grant the request. After Node A has joined the network, it determines how many routers current exist, as shown in step 110. As described above, numerous methods may be used for Node A to determine the number of active routers, including querying the leader node, querying a neighbor node, or monitoring network traffic. If the number of active routers is less than a predetermined threshold, such as $N_{init}$, Node A enables its router capability, as shown in step 120. As described above, this may be done automatically, or the node may send a router request to the leader node. If the number of routers exceeds this predetermined threshold, Node A does not enable its router capability. Rather, it begins monitoring network traffic to determine whether other criteria exist which may require it to serve as a router. For example, as shown in step 130, by monitoring network traffic, Node A may determine that it has two neighbors, both within listening range, which cannot communicate with each other. This may occur at startup where Node A is the only node that is capable of hearing a new node attempting to join the network. Alternatively, this may happen during normal operation due to a topology change, such as the elimination of a previously enabled router. If Node A determines that a connectivity issue exists and that it is able to resolve this issue, it will enable its router capability, as shown in step 120. If no such connectivity issue exists, the device simply maintains its non-router status. Finally, in some embodiments, it may be required that biconnectivity exists within the network. For example, Node A may receive a message from another node within the network asking if it is able to provide a redundant link connecting two groups of nodes, as shown in step 140. If Node A is able to connect the two indicated groups of nodes, it may enable its router capability, as shown in step 120.

The previous disclosure describes various algorithms by which a node may determine that it should enable its router capability. Additionally, it may also be necessary for nodes to determine that they should relinquish their routing ability. This may occur as the number of total routers in the system approaches $N_{max}$, or may be performed on a continuous basis. Thus, in one embodiment, the algorithms allow a node to send a request to the leader node to be removed from the list of routers. In other embodiments, the node simply disables its router capability and may communicate this to its neighbors.

There are several scenarios in which a node may wish to relinquish its router status, as described below.

Figure 5:
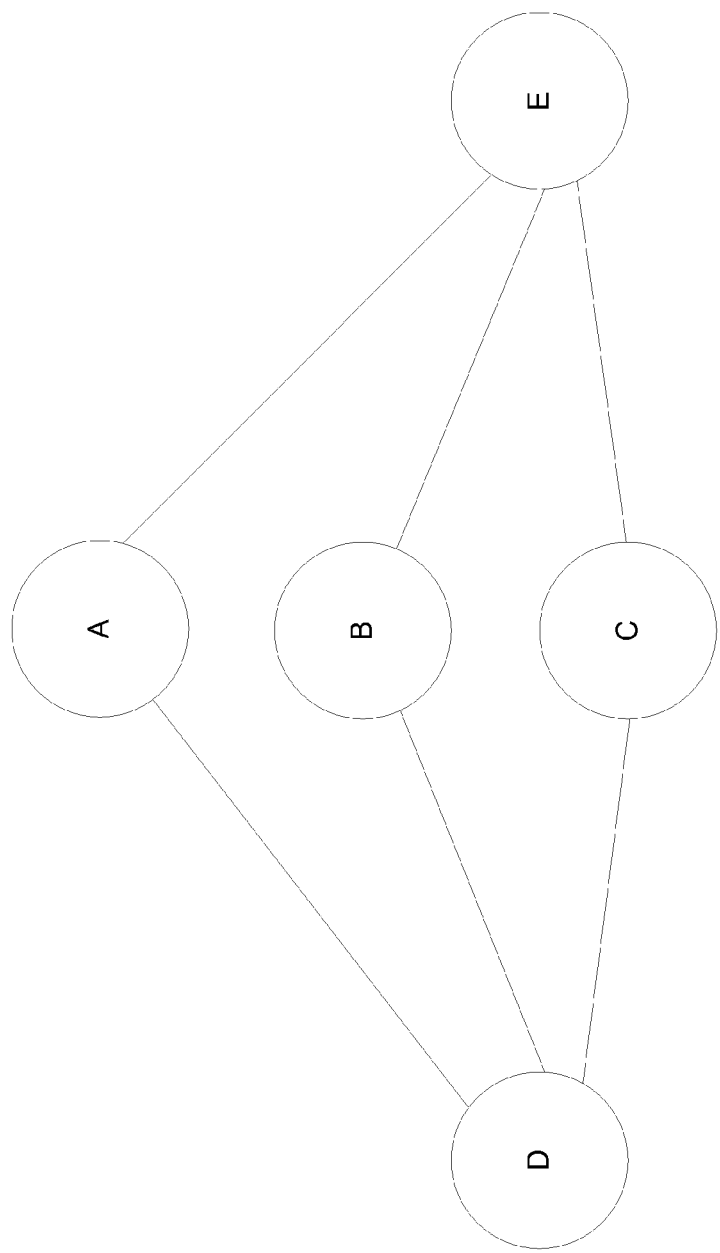
FIG. 5 is a network topology showing a redundant router.

Consider the network topology in FIG. 5. In this network, Node D is in listening distance of three routers Node A, Node B and Node C. Similarly, Node E is also in listening distance of these three routers. In this topology, there are three possible routes between Node D and Node E (i.e. through Node A, through Node B and through Node C). Obviously, there are no connectivity issues in this topology, nor are there any biconnectivity issues. In fact, there are more routers than are required to satisfy both of these criteria. In this embodiment, Node A, Node B and Node C may share their routing information, each identifying its neighbors and the cost from itself to each of those neighbors. Each of these nodes can then compare its costs with those reported by the other nodes. If the costs for one node are greater than or equal to the costs for a second node, that node may be able to relinquish its router capability. For example, if the reported routing costs for Node B are less than or equal to the costs for Node A, Node A can cease being a router without any degradation of network performance.

In one embodiment, if Node A determines that lower or equal costs are available using Node B or Node C, it may send a request to the leader node to relinquish its router capability. In another embodiment, Node A simply disables its router capability and may communicate this to its neighbors.

In another embodiment, the nodes in question may determine first among themselves which will relinquish its router capability before any of the nodes disables its router capability. For example, Node A may have higher or equal costs to Node B, which has higher or equal costs to Node C. Node B may compare its costs to Node C and determine that it should cede its router status, while Node A compares itself to either of the other nodes and makes a similar determination. Additionally, if the costs of these three are all equal, then each may believe that it should cede its router status. Therefore, if Node A determines that it is a candidate to relinquish its router status, it first communicates this intention to the other nodes, Nodes B and C. These nodes will verify that the candidate Node A indeed has routing costs that are equal to or greater than its own. If this verification succeeds, each will indicate to Node A its approval of this decision. If, however, one of the other nodes believes that its costs are actually worse than Node A, it may respond with its own communication stating its intention to withdraw as a router. To avoid deadlock, the criteria used to determine that a node is a candidate to withdraw may differ from the criteria allowing another node to override that node's intention to withdraw.

In this example, Node A had the highest cost and therefore ultimately Nodes B and C will approve of its decision to withdraw as a router. This change in topology will result in one fewer router in the network, and no change in the routing performance through the network. If at a later time, Node B or Node C becomes unavailable, the biconnectivity algorithm described above can be used to reinstate Node A as a router.

The above example assumes that it was necessary to maintain biconnectivity in the network. However, in some networks, such as very large networks, it may be impossible to maintain biconnectivity and limit the number of routers to a given number. In these networks, the requirement for biconnectivity may be waived. In this scenario, referring to FIG. 5, both Nodes A and B may determine that they should relinquish their router capability. In this case, in one embodiment, both of these nodes will send a request to the leader node to remove them from the list of routers. In another embodiment, both of these nodes will simply disable their routing capability. This change in topology has no immediate impact on network performance, as Node C provided the best costs between Nodes D and E. However, the network may take longer to recover if Node C fails at some later time. However, the algorithms described above will be effective in identifying this connectivity issue. Once this connectivity issue is identified, Node A or Node B will enable its router capability, thereby resolving this issue.

Thus, the set of algorithms described herein can be used to automatically configure a mesh network to limit the number of routers. These algorithms are stored in the memory devices of the nodes and can be executed by those nodes. In addition, since these algorithms are executed by each node, the network can respond to changes in network topology quickly and efficiently. In addition, the algorithms can be used to guarantee certain network characteristics. For example, if programmed accordingly, the algorithms can be used to insure biconnectivity throughout the network, without any user intervention. In addition, these algorithms allow the mesh network to be self healing. In other words, if the failure of a node creates a connectivity issue in the network, the nodes, by executing these algorithms can identify that connectivity problem and perform corrective actions. In some embodiments, the corrective action comprises the addition of another router in the network.

Thus, in summary, to implement all of the features described herein, a node needs the following information:
 (A) the number of routers in the network;
 (B) from each neighbor, a list of the routers to which that neighbor is connected;
 (C) a length or path cost for the routers in the lists in (B); and
 (D) from each neighbor, a list of its neighboring routers.

This information may be normally obtained using a traditional routing algorithm. Devices which have not enabled their router capability may obtain this information by overhearing route discovery messages transmitted by neighboring routers.

The number of routers (i.e. the information described in (A)) is used to increase the number of routers in small networks and decrease the number in large networks.

Ensuring connectivity is done using the information from (B). Specifically, if a node has two neighbors that report different lists of reachable routers, then they are not connected and the node should become a router.

The information from (C) is used for detecting redundant routers. If a router has two neighbors both of which report having the same or lower costs to all routers, then that router is redundant and disable its router capability.

The information from (D) is used for biconnectivity. If a node has two sets of neighbors that do not share any neighbor links then the graph is likely not to be biconnected.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of limiting the number of routers in a mesh network, said mesh network comprising a plurality of nodes, each node comprising a processing unit and a network interface, said method comprising:
 determining, using a node of said plurality of nodes, a number of routers currently in said mesh network;
 enabling routing capability of said node if a number of routers currently in said mesh network is less than a predetermined threshold;
 monitoring network traffic, using said network interface, to identify a connectivity issue, if said number of routers is not less than said predetermined threshold; and
 enabling routing capability of said node if said connectivity issue is detected and said node can resolve said connectivity issue.

2. The method of claim 1, further comprising:
 monitoring network traffic, using said network interface, for a message requesting a redundant link between two groups of nodes; and
 enabling routing capability of said node if said node can serve as said redundant link.

3. The method of claim 1, wherein said number of routers is determined by querying a leader node.

4. The method of claim 1, wherein said number of routers is determined by monitoring network traffic.

5. The method of claim 1, wherein said number of routers is determined by querying one of said plurality of nodes in said mesh network.

6. The method of claim 1, wherein said number of routers is limited to a first value, and said predetermined threshold is less than said first value.

7. The method of claim 1, wherein identifying said connectivity issue comprises:
 monitoring said network traffic to hear a request from a node to join said mesh network; and
 not hearing a response to said request.

8. The method of claim 1, wherein identifying said connectivity issue comprises:
 monitoring said network traffic to determine that two nodes, both within said node's listening range, cannot access one another.

9. The method of claim 1, wherein said node disables its router capability.

10. The method of claim 9, wherein said router capability is disabled after a determination is made that said node is redundant.

11. The method of claim 10, wherein said determination comprises identifying at least one other router in said network that can connect neighbors of said node at equal or lower costs.

12. The method of claim 10, wherein said determination comprises identifying at least two other routers in said network that can connect neighbors of said node at equal or lower costs.

13. A method of limiting the number of routers in a mesh network, said mesh network comprising a plurality of nodes, each node comprising a processing unit and a network interface, said method comprising:
 monitoring, at a node of said plurality of nodes, network traffic using said network interface;
 identifying, using said node, a connectivity issue; and
 enabling routing capability of said node if said node can resolve said connectivity issue;

wherein identifying said connectivity issue comprises:
monitoring network traffic to determine neighbors of said node;
querying each of said neighbors to determine neighbors of said neighbors; and
determining that at least one of said neighbors is part of a first group and at least a second of said neighbors is part of a second group, where there are no nodes common to said first group and said second group.

14. A method of limiting the number of routers in a mesh network, said mesh network comprising a plurality of nodes, each node comprising a processing unit and a network interface, said method comprising:
monitoring, at a node of said plurality of nodes, network traffic using said network interface;
identifying, using said node, a connectivity issue, wherein identifying said connectivity issue comprises:
monitoring said network traffic to hear a request from a second node to join said mesh network; and
not hearing a response to said request;
sending a message to said second node, after not hearing a response to said request to join said mesh network, informing said second node of its availability to serve as a router;
receiving a response from said second node requesting said node to serve as a router; and
enabling routing capability of said node if said node can resolve said connectivity issue, wherein said enabling routing capability occurs after receiving said response from said second node.

* * * * *